(12) United States Patent
Crome et al.

(10) Patent No.: US 6,194,335 B1
(45) Date of Patent: Feb. 27, 2001

(54) MODULAR CERAMIC ELECTROCHEMICAL APPARATUS AND METHOD OF MANUFACTURE THEREFORE

(75) Inventors: Victor Paul Crome, Davenport; Russell Frank Hart, Blue Grass; Scott Richard Sehlin, Bettendorf, all of IA (US)

(73) Assignee: Litton Systems, Inc., Woodland Hills, CA (US)

( * ) Notice: Subject to any disclaimer, the term of this patent is extended or adjusted under 35 U.S.C. 154(b) by 0 days.

(21) Appl. No.: 09/418,831

(22) Filed: Oct. 15, 1999

Related U.S. Application Data (63) Continuation of application No. 09/010,828, filed on Jan. 22, 1998, now Pat. No. 5,985,113, which is a continuation-in-part of application No. 08/518,646, filed on Aug. 24, 1995, now abandoned.

(51) Int. Cl.[7] .................................................. C04B 35/48
(52) U.S. Cl. ........................... 501/103; 501/152; 429/30; 429/31; 429/32; 429/33; 252/62.2; 264/63
(58) Field of Search ................................. 429/30, 33, 27, 429/31, 32, 38, 39, 40; 204/279–281, 286, 290 R, 290 F, 297 R, 265, 266, 288, 289; 252/62.2; 264/63; 501/103, 152

(56) References Cited

U.S. PATENT DOCUMENTS

| | | | |
|---|---|---|---|
| 4,640,875 | 2/1987 | Makiel | 429/30 |
| 4,649,003 | 3/1987 | Hashimoto et al. | 264/63 |
| 4,686,158 | 8/1987 | Nishi et al. | 429/33 |
| 4,702,971 | * 10/1987 | Isenberg | 429/31 |
| 4,851,303 | 7/1989 | Madou et al. | 429/33 |
| 4,943,494 | 7/1990 | Riley | 429/30 |
| 5,155,158 | 10/1992 | Kim | 264/63 |
| 5,205,990 | 4/1993 | Lawless | 422/121 |
| 5,302,258 | 4/1994 | Renlund et al. | 204/129 |
| 5,306,574 | 4/1994 | Singh et al. | 429/13 |
| 5,332,483 | 7/1994 | Gordon | 429/30 |
| 5,385,874 | 1/1995 | Renlund et al. | 501/103 |
| 5,582,710 | 12/1996 | Mairesse et al. | 429/33 |
| 5,723,101 | 3/1998 | Cuif | 501/152 |
| 5,852,925 | 12/1998 | Prasad et al. | 60/39.02 |
| 5,871,624 | 2/1999 | Crome | 204/286 |
| 5,985,113 | 11/1999 | Crome et al. | 204/286 |

* cited by examiner

Primary Examiner—Bruce F. Bell
(74) Attorney, Agent, or Firm—Lowe, Hauptman, Gopstein, Gilman & Berner (57) ABSTRACT

A ceramic element is provided which can be injection molded from an electrolyte and a binder. The ceramic element includes a tube support portion and a plurality of tubes extending from the tube support portion. The plurality of tubes are arranged in rows and columns. A plurality of vias extend from one surface of the tube support portion to an opposite surface of the tube support portion. The ceramic element is coated with an electrically conductive coating and a current collector coating. The vias are coated with the electrically conductive coating and plugged. After the coatings are removed in selected areas of the ceramic element, the tubes of the ceramic element form a series-parallel array because tubes in the same column are connected in parallel electrically and tubes in adjacent rows are connected in series electrically. Two ceramic elements are sealed together to form a modular electrochemical device. The electrochemical device can be either an oxygen generator or a fuel cell. Oxygen generating capacity can be increased by manifolding together two or more modular oxygen generators.

21 Claims, 9 Drawing Sheets

← Electrical current flow
▨ Current Collector
▧ Electrode
☐ Electrolyte
⊠ Electrical Isolation Cut

MODULAR CERAMIC ELECTROCHEMICAL APPARATUS AND METHOD OF MANUFACTURE THEREFORE

This application is a continuation of application Ser. No. 09/010,828 filed Jan. 22, 1998, now U.S. Pat. No. 5,985,113 which is a continuation-in-part application of U.S. patent application Ser. No. 08/518,646 filed on Aug. 24, 1995, now abandoned.

FIELD OF THE INVENTION

This invention relates to electrochemical devices, and more particularly, the invention relates to electrochemical devices using one or more ceramic elements.

BACKGROUND OF THE INVENTION

Electrochemical processes can remove oxygen from air by ionizing oxygen molecules on one surface of an electrolyte and then transporting the oxygen ions through a solid electrolyte. The oxygen molecules are then reformed on an opposite electrolyte surface. An electric potential is applied to a suitable catalyzing electrode coating applied to the surface of the electrolyte. The electrode coating is porous to oxygen molecules and acts to dissociate oxygen molecules into oxygen ions at its interface with the electrolyte. The oxygen ions are transported through the electrolyte to the opposite surface, which is also coated with a catalyzing electrode and electrically charged with the opposite electric potential which removes the excess electrons from the oxygen ions, and the oxygen molecules are reformed.

Although electrochemical devices are generally known there are significant disadvantages associated with using known devices as oxygen generators. For example, in the fuel cells described in U.S. Pat. Nos. 4,640,875 and 5,306,574, the individual electrodes are made from a ceramic material while the manifold into which each of the electrodes is inserted is made from stainless steel. This structure is difficult and expensive to manufacture because many parts must be assembled. More importantly, the electrochemical device operates at high temperatures, typically between 700–1000° C., and the different coefficients of thermal expansion between the stainless steel and the ceramic frequently cause cracks and thus leakage between the ceramic electrode and the stainless steel manifold. This leakage can be especially severe if a high pressure is developed within the electrochemical device. For example, oxygen generators capable of producing at oxygen at high pressures of 2000 psi are unknown to the inventors.

Further in both of these electrochemical devices, whether the device is used as an oxygen generator or as a fuel cell, the electrical interconnections used to form a series-parallel array between the electrodes require direct contact of the outer peripheries of the individual electrodes. The interconnection arrangement is expensive to manufacture, less reliable in operation, and reduces the surface area available for electrochemical exchange.

It is, therefore, an object of the present invention to provide a ceramic electrolyte element which can be formed and used in an electrochemical device.

It is another object of the invention to provide a ceramic electrolyte element having a configuration which provides for an increased active surface area per unit volume and weight of ceramic material.

It is yet a further object of the invention to provide a composition including an electrolyte and a binder which can be injection molded to form a ceramic electrolyte element.

Another object of this invention is to provide a ceramic electrochemical device wherein the electrical connections connecting the electrodes are simplified.

A further object of this invention is to provide an electrochemical device capable of delivering oxygen at 2000 psi or greater.

Still another object of this invention is to provide a ceramic electrochemical device which is of a modular configuration and thereby provides a simple "building block" approach to meet differing requirements for amounts of oxygen to be generated.

SUMMARY OF THE INVENTION

These and other objects of the present invention are achieved by providing a ceramic element which can be injection molded from an electrolyte and a binder. The ceramic element includes a tube support portion and a plurality of tubes extending from the tube support portion. The plurality of tubes are arranged in rows and columns. A plurality of vias extend from one surface of the tube support portion to an opposite surface of the tube support portion. The ceramic element is coated with an electrically conductive coating and a current collector coating. The vias are coated with the electrically conductive coating and plugged. After the coatings are removed in selected areas of the ceramic element, the tubes of the ceramic element form a series-parallel array because tubes in the same column are connected in parallel electrically and tubes in adjacent rows are connected in series electrically. Two ceramic elements are sealed together to form a modular electrochemical device. The electrochemical device can be either an oxygen generator or a fuel cell. Oxygen generating capacity can be increased by manifolding together two or more modular oxygen generators.

These and other objects are achieved by providing a one-piece ionically conductive ceramic electrolyte element including a tube support portion having first and second surfaces and a plurality of tube portions extending from the first surface. The tube portions each have a closed end and an open end. The second surface is at least partially open to the atmosphere. The open ends of the plurality of tube portions being open to the atmosphere through the second surface.

In another aspect of the invention these and other objects are achieved by an electrochemical device including a first ceramic element having a support member and an array of elongated members extending from the support member. A second ceramic element is adjacent the first ceramic element. A seal is between the first ceramic element and the second ceramic element. The first ceramic element, the second ceramic element and the seal form a pressure tight chamber therebetween. The elongated members are open to the chamber.

In another aspect of the invention these and other objects are achieved by a method of generating oxygen including forming an oxygen generator having a first electrode and a second electrode. Electric current is supplied at a first polarity to the first electrode and electric current is supplied at a second polarity to the second electrode. Oxygen pressure is built within the oxygen generator. The oxygen is output at 2000 psi or higher.

In another aspect of the invention these and other objects are achieved by a ceramic module product produced by a method comprising mixing a ceramic powder and a binder. The mixed ceramic powder and binder are injection molded into a ceramic module having a support portion and a plurality of projecting portions extending therefrom.

A number of module assemblies can have their output ports connected together to form a system of greater capacity.

Still other objects and advantages of the present invention will become readily apparent to those skilled in this art from following detailed description, wherein only the preferred embodiments of the invention are shown and described, simply by way of illustration of the best mode contemplated of carrying out the invention. As will be realized, the invention is capable of other and different embodiments, and its several details are capable of modifications in various obvious respects, all without departing from the invention. Accordingly, the drawings are to be regarded as illustrative in nature, and not as restrictive.

BRIEF DESCRIPTION OF THE DRAWINGS

The present invention is illustrated by way of example, and not by limitation, in the figures of the accompanying drawings, wherein elements having the same reference numeral designations represent like elements throughout and wherein.

DETAILED DESCRIPTION OF THE DRAWINGS

Figure 1:
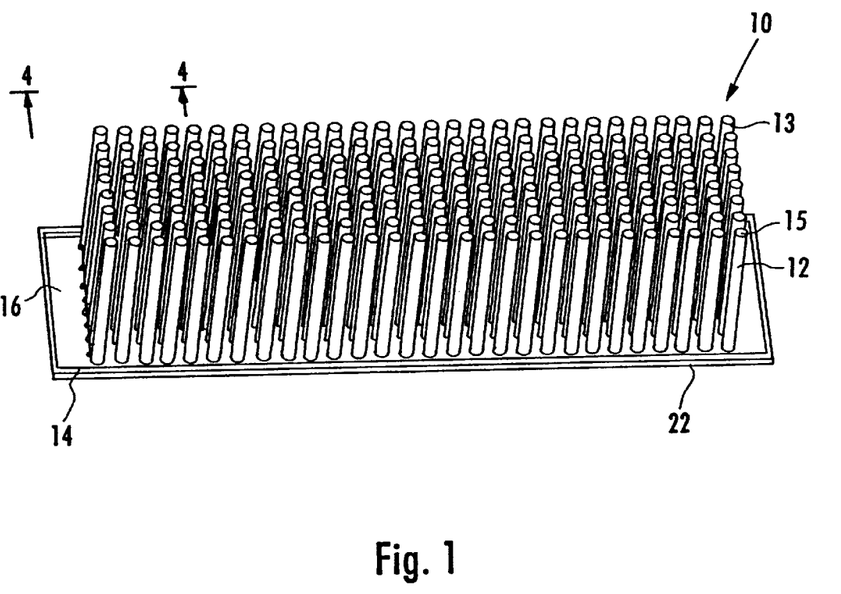
FIG. 1 is a top perspective view of an injection molded, modular ceramic element used in an electrochemical module assembly according to a first embodiment of the present invention.

Referring first to FIG. 1, a ceramic modular element 10 is illustrated which is constructed in accordance with the principles of the present invention. It should be understood that the ceramic modular elements are depicted in an upright orientation in FIGS. 1 and 5 and it should be understood that the use of the invention is not limited to the upright orientation depicted. Thus, the use of terms such as "downwardly", "upwardly", "left", "right", etc. as used herein is only for purposes of convenience of description and these terms should be construed in the relative sense.

The described embodiments of the ceramic modular element are preferably injection molded in one-piece of an ionically conductive ceramic electrolyte. The ceramic modular element can also be machined, either in one-piece from a solid block of the same or similar ceramic material, or from several members and then bonded together to form the modular ceramic element. Whether injection molded or machined, advantageously, the entire element is manufactured from a single material to eliminate problems associated with using different materials having different coefficients of expansion. A single material having a uniform coefficient of thermal expansion provides for leak free operation as described in detail below.

Advantageously, the modular ceramic element provides a large surface area per unit volume. As discussed in detail below, the ceramic modular element is preferably usable in pairs to form either an oxygen generating assembly or a fuel cell assembly. The symmetry of the modular construction of the ceramic element allows a second element to be inverted and sealed to the first element to form either the oxygen generator or fuel cell assembly. The second element 10' is preferably identical to the first element 10 and identical features are denoted with an apostrophe.

The ceramic modular element 10 includes an array of spaced apart elongated tubes 12 extending from a generally planar tube support member 14. The support member 14 is of a generally rectangular configuration. It is to be understood that while circular or cylindrical tubes 12 having exterior and interior surfaces are depicted in the described embodiments, other configurations for the "tubes" could be used and the term "tube" is used herein only for purposes of convenience of reference. The array, as depicted in FIG. 1, has eight rows and twenty-eight columns, for a total of two hundred and twenty-four tubes although the invention is not limited to the number of tubes illustrated. The number, size and length of the tubes 12 depends, for an oxygen generator, on the amount of oxygen desired to be produced. A distal outer end of each tube 12 is closed at an end 15.

As depicted in FIG. 1, the ceramic modular element 10 in the first embodiment has a flange portion 20 around the perimeter thereof which extends downwardly from a lower surface 18 of the ceramic modular element 10.

Figure 2:
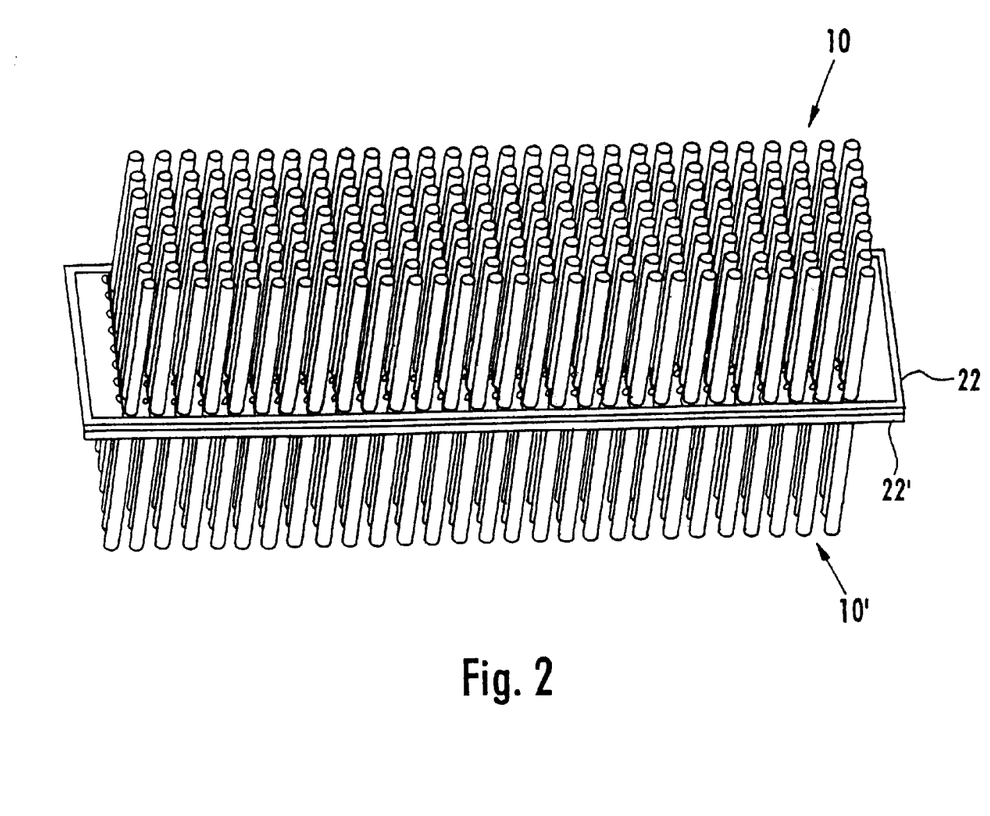
FIG. 2 is a side elevational cross sectional view of the ceramic element of FIG. 1, which for clarity, only depicts some of the tubes.

For use as an oxygen generator, a major portion of an exterior surface of the ceramic modular element 10 is coated, during a coating process, with a catalyzing and electrically conductive material, as depicted in FIG. 2. Additionally, and preferably, the ceramic modular element 10 is then coated with a current collecting coating. The exterior surface of element 10 includes an upper surface 16 and outer surfaces 13 of the tubes 12 along with the closed ends 15 thereof. Likewise, the lower surface 18 and interior surface 17 of each of the tubes 12 are coated with a similar electrically conductive material and then preferably a current collecting coating. The closed ends 15 of tubes 12 have a flat interior surface 19 and a flat exterior surface 23 as depicted in FIG. 2 although in either of the described embodiments the surfaces 19 and 23 can be either flat or curved or a combination thereof. The interior surfaces 17 of the tubes 12 are open to the atmosphere as depicted in FIG. 1.

For use in a fuel cell, in all described embodiments, the modular ceramic element is coated with only a metal ceramic composite coating on the surfaces exposed to fuel. The surface exposed to air or oxygen would be coated with the same coatings as used on the oxygen generator as described herein. The metal ceramic composite is electrically conductive but differs in composition from the coating used for the oxygen generator because of the oxidizing environment to which the fuel cell is exposed during operation. The coating is 30–70% vol. Ni and 30–70 vol. stabilized zirconia with 40% vol. Ni and 60% vol stabilized zirconia being preferred. The electrical interconnections described herein are the same whether the ceramic element 10 is used in an oxygen generator assembly or a fuel cell assembly. Preferably, the wall thicknesses used in a fuel cell would be less than that for a similarly sized oxygen generator to improve the electrical efficiency.

Figure 3:
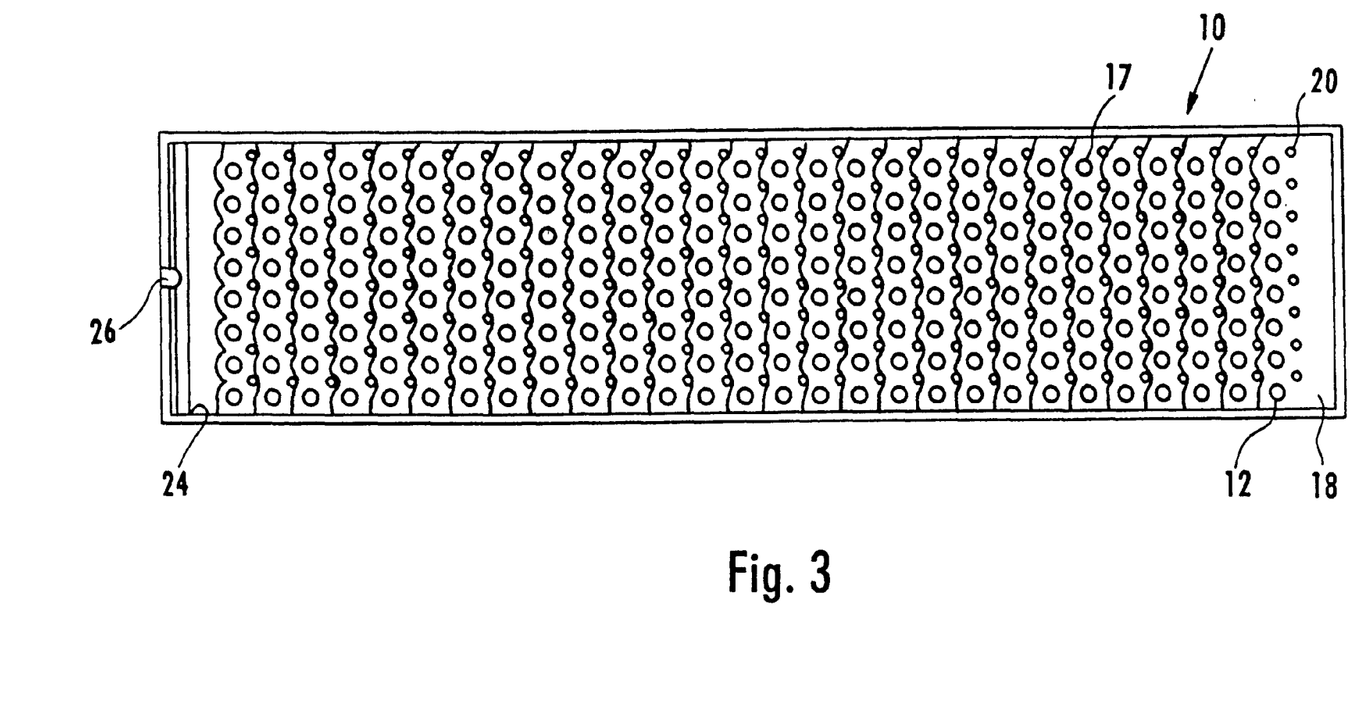
FIG. 3 is a bottom plan view of the ceramic element of FIG. 1.

As depicted in FIG. 3, a series of vias 24 extend from upper surface 16 through to the lower surface 18. The vias 24 are holes which extend through the ceramic electrolyte. Each via 24 is located adjacent to a corresponding tube 12 and offset therefrom in both length and width directions as depicted in FIG. 3. The number of vias 24 corresponds to the number of tubes 12 and the vias 24 are similarly positioned in columns and rows. The vias 24 are plated through (and filled or plugged) with the electrically conductive coating during the coating process.

A series of reinforcing ribs 26 are illustrated in FIG. 3 which extend downwardly from the lower surface 18 and are connected at opposite ends to the flange portion 20. Each reinforcing rib 26 is positioned between a column of tubes 12 and a column of vias 24. The reinforcing ribs 26 have a plurality of arcuate sections joined together with two arcuate sections being joined together adjacent a via 24. The flange portion 20 extends a greater distance from the lower surface 18 than do ribs 26. The ribs 26 are coated during the coating process.

After the coating process, the catalyzing and electrically conductive material on portions of the upper and lower surfaces 16 and 18, respectively, may be removed to form the desired electrical connections (to be described) through certain vias 24.

Refer back to FIG. 2 which is a partial cross-sectional view taken along the line 2—2 in FIG. 1 with the tubes being labeled as 12a, 12b, 12c, 12d and the vias being labeled as 24a, 24b, 24c, 24d. Thus, FIG. 2 is a cross-sectional view of four tubes from a first row of twenty-eight in the described first embodiment with tube 12a being from column a, tube 12b being from column b, and so forth. The tubes 12 and tube support member 14 are of the ceramic electrolyte material. The outer surfaces 13 of the tubes 12 and the upper surface 16 of tube support member 14 are continuously coated with a coating 30 of the ionizing and electrically conductive material. Likewise, the interior surfaces 17 of tubes 12, lower surface 18 and reinforcing ribs 26 are coated with a coating 32 of the same or similar electrically conductive material. As mentioned, in this coating process, the vias 24 extending through tube support member 14 will be filled with the electrically conductive material. The entire surface area is coated by, for example, a dipping process or a spraying process.

In order to form these coatings 30, 32 or the metal ceramic composite coating into electrical circuits capable of creating an electrochemical device, such as an oxygen generator, it is necessary to selectively remove certain of the electrode material to produce the desired electrical connections. The removal of the electrode material can be done using a laser to cut the electrode material and isolate the electrode material on adjacent tubes. Rather than using a laser, it is preferred to use an electrical discharge machine to remove the electrode material because the electrical discharge machine does not cut into the underlying ceramic. To this end, a series of cuts 40a, 40b, 40c, 40d are made in the coating 32 on the lower surface 18 of tube support member. The cuts 40a–40d may be made with a suitable laser and extend longitudinally between the columns of tubes 12 the full dimension of tube support member 14 between opposed longitudinal portions of the flange portion 20. Likewise cuts 42a, 42b, 42c, 42d are made in the coating 30 formed on the upper surface 16 of tube support member 14. Again, these cuts 42a–d extend longitudinally the full dimension of tube support member 14 between opposed longitudinal portions of the flange portion 20 along each column of tubes 12. These cuts extend through the entire thickness of the coating 30, 32 but if a laser is used, preferably penetrate the ceramic as little as possible. If a vertical outer surface 44 of flange portion 20 is coated during a coating process then the coating 30 should be removed therefrom.

It will be noted that cut 42a is made on the side of via 24a nearer tube 12a while cut 40a is made on the side of via 24a nearer tube 12b. Thus, a series connection is made between the coating 32 on the interior surface 17 of tube 12a and the coating 30 on the exterior surface 13 of tube 12b. Similarly, a series connection is made between the coating 30 on the exterior surface 13 of tube 12b and the coating 32 on the interior surface of tube 12c. A series connection is made between the coating 32 on the interior surface of tube 12c and the coating 30 on the exterior surface of tube 12d. The same series connections would be made between succeeding adjacent tubes 12 but for the sake of simplicity is not described here. Thus, adjacent tubes 12 in different columns but in the same row are connected in series. The tubes 12 which are in the same column but different rows are connected in parallel electrically. The cuts 40 and 42 made longitudinally of columns of tubes, such as the cuts 40a and 42a between columns formed by tubes 12a 12b, and the like cuts between the other columns of tubes, in effect, form the tubes 12 in a column into a parallel electrical circuit. By allowing the electrically conductive material to remain in the vias 24 the best possible low resistance connection between the tubes 12 is formed. Thus, each tube 12 is an electrode with the exterior surface 13 of each tube 12 being a cathode and the interior surface 17 being an anode.

Figure 2A:
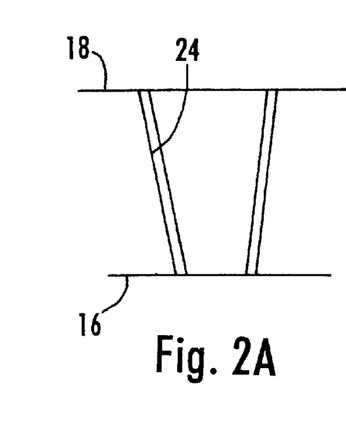
FIG. 2A is an enlarged side elevational view in cross section of a tapered via.

An enlarged cross-sectional view of via 24 is illustrated in FIG. 2A. As depicted in FIG. 2A, the via 24 is preferably tapered with the larger diameter end of via 24 being in surface 18 and the smaller diameter end of via 24 being in surface 16. The taper is advantageous because surface 18 is exposed to high pressure and the plug (not shown) which is inserted into the via 24 becomes tighter and provides a better seal as the pressure increases.

The result of this arrangement, using the FIG. 1 embodiment as an example, is that in the combination of twenty-eight columns of eight tubes each (eight rows) the electrodes (first and second electrodes) of each tube in each column of eight tubes are in parallel electrically. Each of the twenty-eight columns are in series electrically. It should be noted that this arrangement is only exemplary and the sizes of the tubes and the arrangement of the rows and columns of tubes can be varied allowing the arrangement of the series and or parallel electrical connections to be optimized for each tube for best voltage and current distribution. In the illustrated example, if it is assumed that the FIG. 1 element receives power from a twenty-four volt supply, the voltage applied across each tube would be less than one volt because each column of tubes acts in effect, as one of twenty-eight series resistors. The voltage required to effect the ionization and transport oxygen across such a device is affected by several parameters including: operating temperature, differential oxygen partial pressure across the generator, ionic conductivity of the electrolyte, electrical resistance of the electrolyte, electrode interface, spreading resistance of the electrode and resistance of the electrical connections to the generator. In general, however, this voltage is less than one volt and can be a small fraction of a volt in optimized arrangements. The number of tubes (or columns of tubes) is dependent on the power supply voltage and the desired voltage to be applied to each tube. It is to be understood that each column of eight tubes (and associated vias) in this example could be further subdivided such that eight separate series of twenty-eight tubes each are formed. However, nonuniformity of electrode characteristics could cause localized overheating and subsequent burnout of one tube resulting in the loss of the series of twenty-eight tubes. Arranging the tubes into columns as shown with multiple vias provides redundancy and normalization of the current flow.

As depicted in FIG. 3, an exit port 50 is provided in tube support member 14 through flange portion 20. The exit port 50 is located in a shorter portion of flange portion 20 although the exit ports could also exit along the longer edges of the elements 10 and 10' to allow side-by-side rather than end-to-end connection of a plurality of module assemblies. To form an oxygen generator assembly there is only a single exit port in each ceramic element 10. To form a fuel cell assembly there is an entrance port (not shown) and an exit port 50 in each ceramic element.

Figure 4:
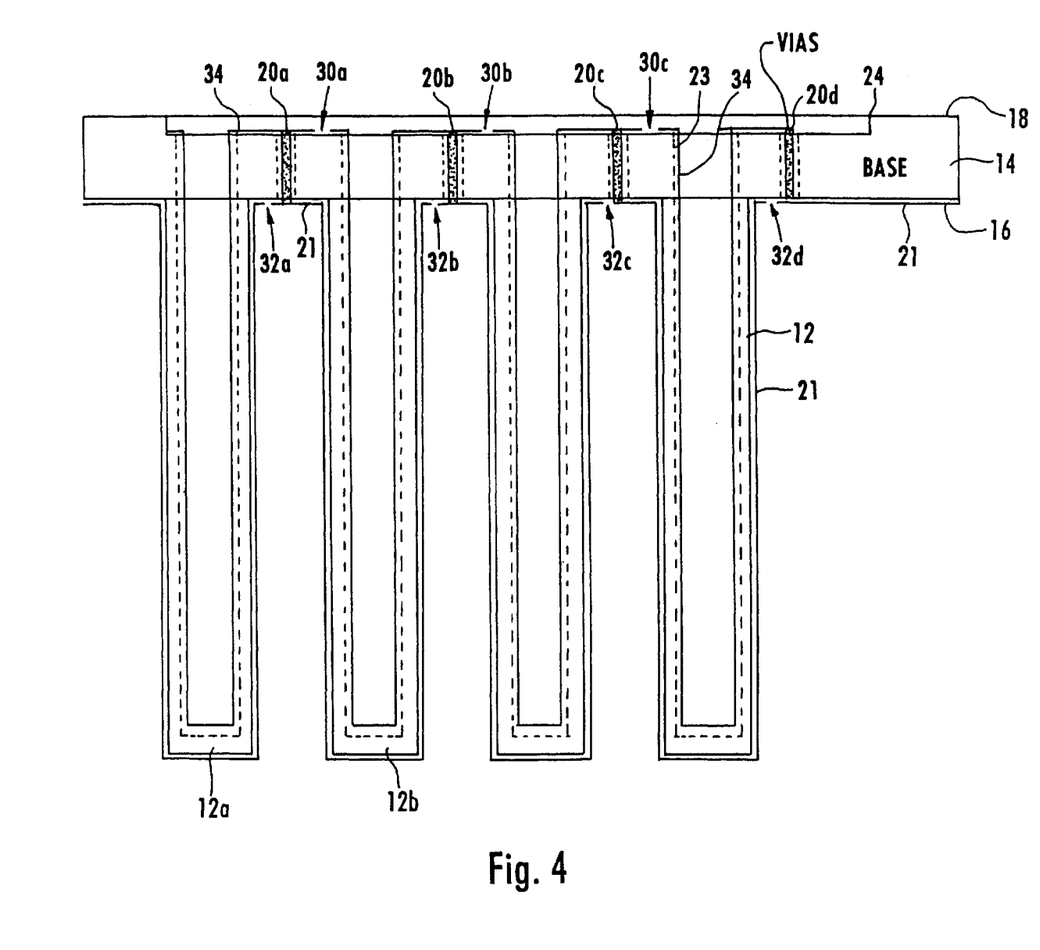
FIG. 4 is a top perspective view of two FIG. 1 molded elements formed into an electrochemical module assembly.

A module assembly 70 is depicted in FIG. 4. The elements 10 and 10' forming the FIG. 4 module assembly 70 are preferably identical and symmetrical to form complete assembly 70. The flange members 20, extend outwardly from the lower surface 18 of tube support member 14 around the perimeter thereof so that when the elements 10 and 10' are placed together, the flange members 20 and 20' are joined to form a sealed space or manifold in the interior thereof between the lower surfaces 18 of the two elements 10 and 10'. In either of the described embodiments, a cover plate (not shown) can be used in place of ceramic element 10'.

In operation, for an oxygen generator, the air or the gas from which oxygen is to be extracted flows across the tubes 12 and by reason of the principles of ionic conductivity, a gas having a higher pressure of oxygen is formed in the interiors of tubes 12 and is collected in the sealed space formed between the two element assemblies 10, 10'. Each individual tube 12 acts as an electrolyte with the outer surface being at a first electrical potential and the inner surface being at a second electrical potential. The electrical potential between the outer surface 13 and the inner surface 17 causes oxygen molecules to dissociate from air at surface 13. The electrical potential causes the oxygen ions to flow through the dense ceramic electrolyte and the oxygen molecules are reformed at the inner surface 17. This supply of oxygen is communicated through exit port 50 as desired. Electrical current is supplied to the coatings on the exterior of the module 70 and oxygen is output through exit port 50 (FIG. 3). The expected oxygen ouput would be 99.5% or higher pure oxygen.

When used as a fuel cell, the module assembly would have an entrance port and an exit port 50. A fuel such as hydrogen or natural gas would flow into the entrance port and exit through exit port 50. An oxidant such as air or high purity oxygen would surround the exterior of the fuel cell assembly. The air and fuel react with a respective anode and cathode.

An alternative arrangement to each column of hollow tubes is a hollow "cantilever shelf" configuration which would provide approximately the same effective surface area. Flat hollow sections with one end molded closed would be manifolded together as the tubes are to provide a common output port. Internal stiffening ribs could be added between the opposing flat walls to increase the ability to withstand internal pressure as required.

Figure 5:
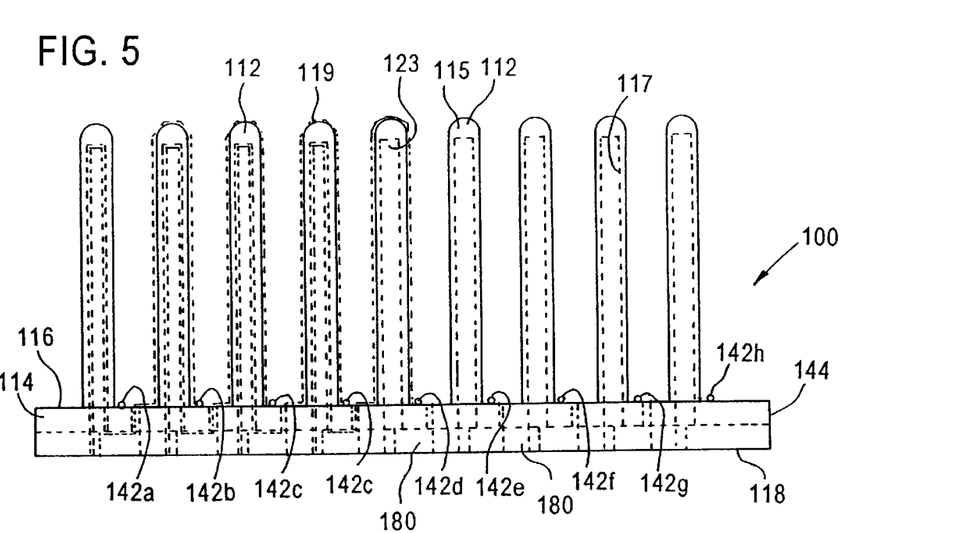
FIG. 5 is a side elevational cross sectional view of an injection molded, modular ceramic element used in an electrochemical module assembly according to a second embodiment of the present invention.
Figure 6:
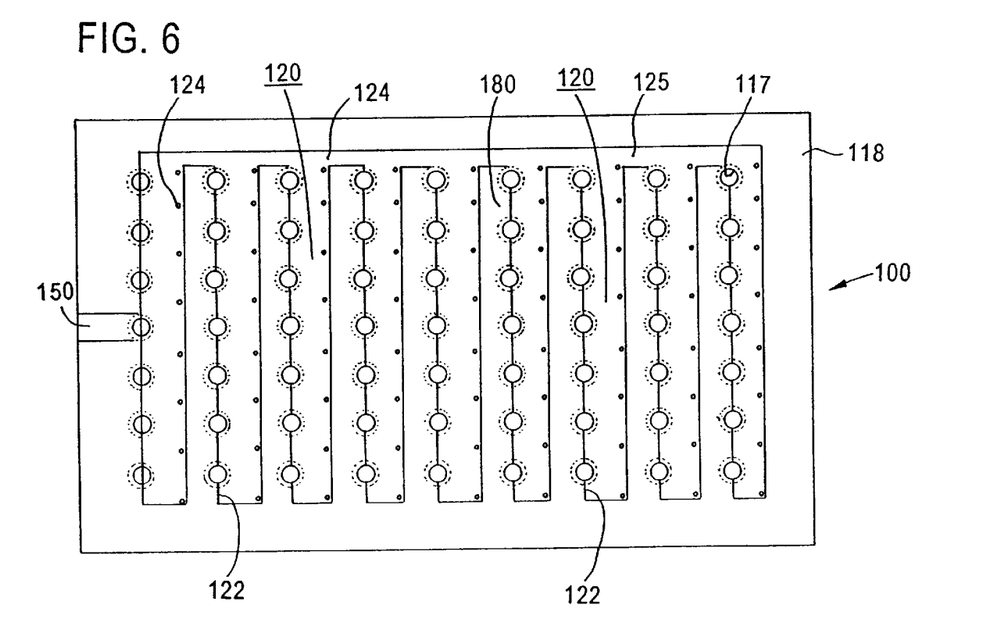
FIG. 6 is a bottom plan view of the ceramic element of FIG. 4.
Figure 7:
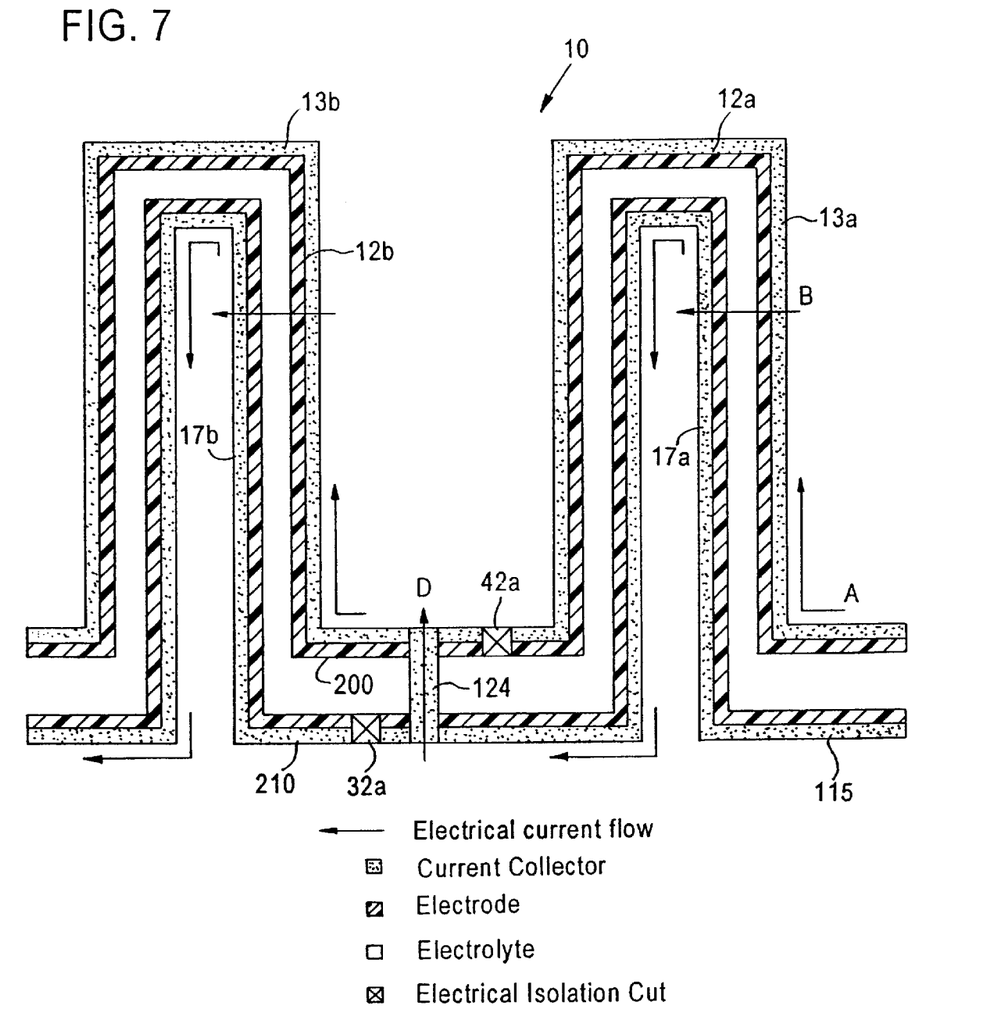
FIG. 7 is a schematic diagram illustrating the electrical interconnections of FIGS. 2 and 5.
Figure 8:
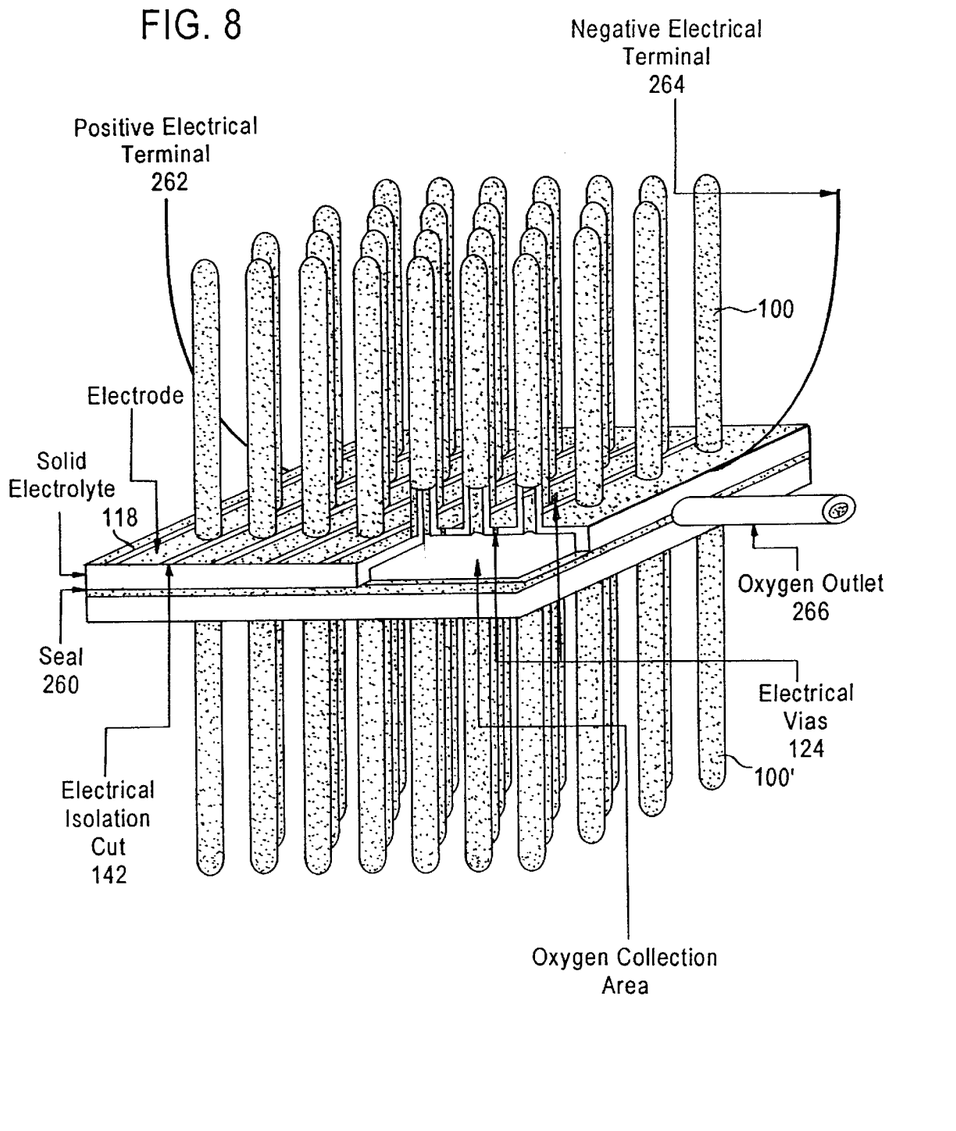
FIG. 8 is a top perspective view of two FIG. 5 molded elements formed into an electrochemical module assembly.
Figure 9A:
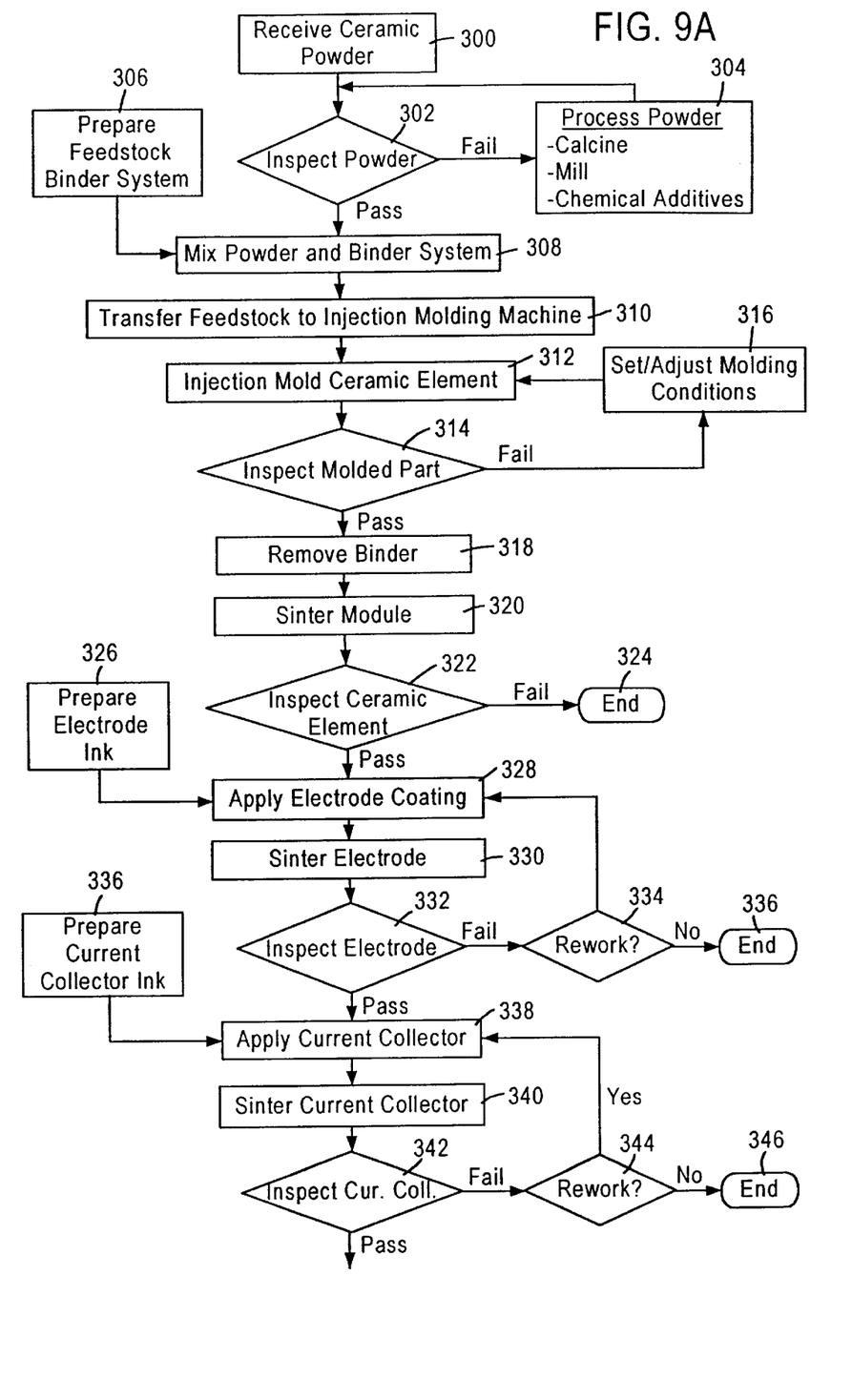
FIGS. 9A and 9B are flow charts illustrating the steps used in the manufacturing process of a ceramic element.
Figure 9B:
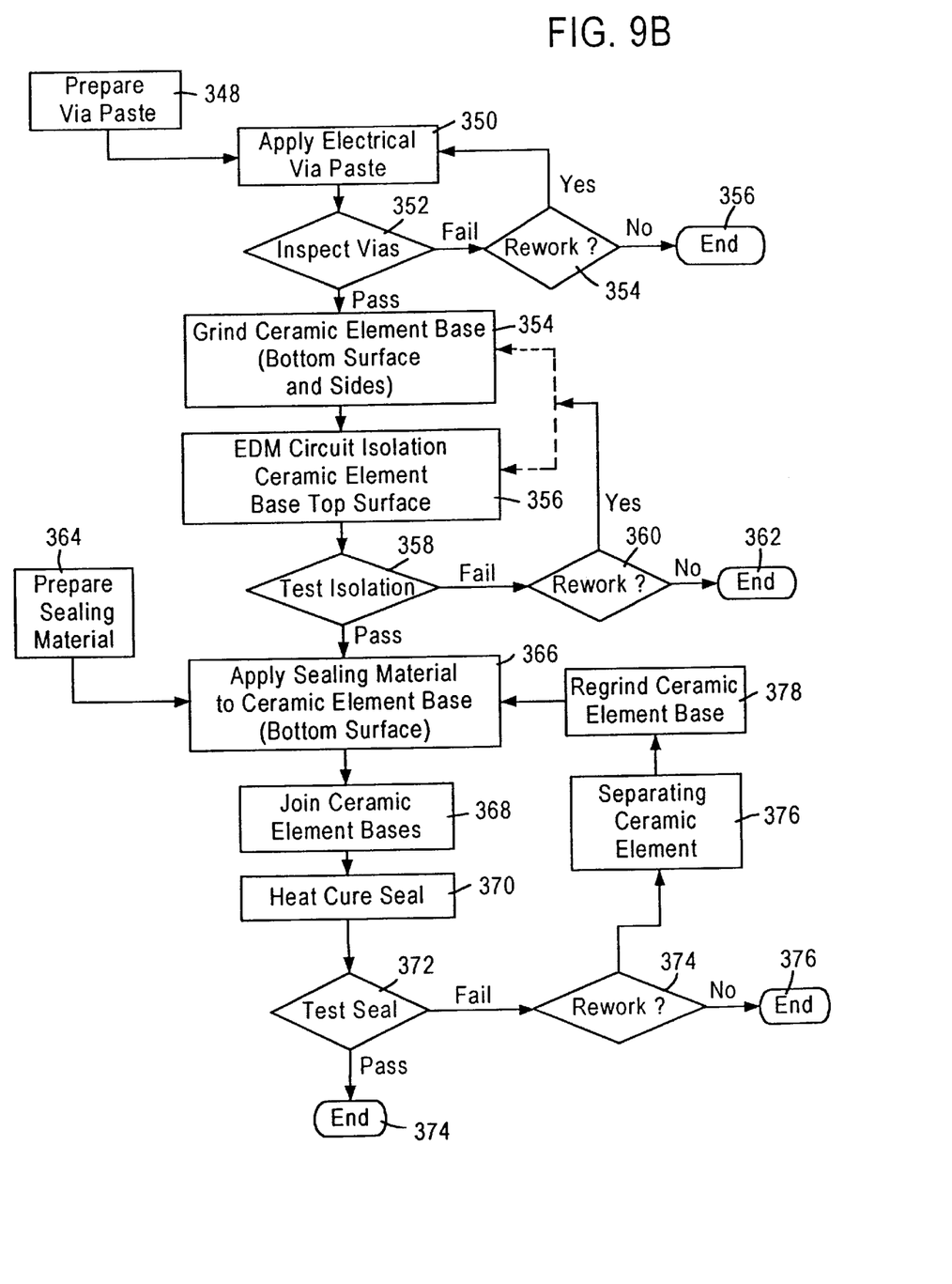

It should be noted that the ceramic modular element 10 depicted in FIGS. 1–4 is to a first embodiment and the ceramic modular element 100 depicted in FIGS. 5–6 and 8 is to a second embodiment. FIGS. 7 and 9A–9B and the description thereof are common to both embodiments.

The ceramic modular element 100 depicted in FIG. 5 includes an array of spaced apart elongated tubes 112 extending from a generally planar tube support member 114. The support member 114 is of a generally rectangular configuration. The array, as depicted in FIG. 5, has seven rows and nine columns, for a total of sixty-three tubes although the invention is not limited to the number of tubes illustrated. The number, size and length of the tubes 112 depends, for an oxygen generator, on the amount of oxygen desired to be produced. A distal outer end of each tube 112 is closed at an end 115. The tubes 112 may have a wall thickness as thin as 0.015 inches.

The tubes 112 have a flat interior surface 119 and a curved exterior surface 123. Interior surfaces 117 of the tubes 112 are open to the atmosphere as depicted in FIG. 5. The tube support member 114 has a flat upper surface 116 and a flat lower surface 118. A plurality of spaced apart generally rectangular recesses 120 are formed inwardly from lower surface 118 which are joined together by a rectangular channel 125 located at one side of each of the recesses 120. The location and shape of the channel 125 is illustrative and may be other configurations so long as each of the recesses 120 is in fluid communication with an outlet. An edge 122 of each recess 120 intersects with an open end of each tube 112 at approximately a center of each of the tubes 112. The portions of tube support member 114 located between recesses 120 are support ribs 180. As depicted in FIG. 6, an exit port 150 is formed in support member 114 and connects the manifolded tubes 112 to an exit in a length direction (along a shorter wall) of support member 114.

As depicted in FIGS. 5–6, a series of vias 124 extend from upper surface 116 through to recesses 120. The vias 124 are holes which extend through the ceramic electrolyte. Each via 124 is located adjacent to a corresponding tube 112 and offset therefrom in both length and width directions as depicted in FIG. 3. The number of vias 124 corresponds to the number of tubes 112 and the vias 124 are similarly positioned in columns and rows. The vias 124 are plated through (and filled or plugged) during the coating process.

A schematic representation of the molded ceramic electrolyte is depicted in FIG. 7 having an electrically conductive electrode coating 200 over the entire exterior and interior surface of ceramic element 10. A current collector coating 210 is then applied over the entire electrode coating 200. To electrically isolate the coatings 200, 210 on adjacent tubes 112 in adjacent columns, the bottom surface 118 of support member 114 can preferably be ground to remove the coatings from the bottom surface 118. Grinding the bottom surface 118 provides the advantage of providing a flat surface for sealing (FIG. 6). Any coating on vertical outer surface 144 (FIG. 5) should be ground off to electrically isolate the coatings on the exterior and interior surfaces. Alternatively, electrical isolation cuts 132a–132h can be made as schematically illustrated in FIG. 7. Electrical isolation cuts 142a–142h can then be cut as depicted in FIG. 5 in the manner described above with respect to the first embodiment. Alternatively, selected areas of the upper surface 116 may be masked to prevent coatings 200, 210 from adhering to the ceramic. Advantageously, the tubes 112 are electrically interconnected yet still are spaced apart from each other and do not require the peripheries of the tubes to be in direct contact with each other to complete the electrical connections. The completed assembly is not adversely affected by the extreme temperature and chemical environments experienced when oxygen generators and fuel cells are used.

In operation, a positive electrical terminal is connected at A (see reference number 262 in FIG. 8) forming the cathode. The negative electrical terminal is not shown in this schematic diagram (see reference number 264 in FIG. 8). Electrons flow across the tube 12 as indicated by arrow B to the anode. Current flows through the anode as indicated by arrow C and through the via 24 as indicated by arrow D. Electrical isolation cut 142a prevents current flow between the exterior surface 13a of tube 12a and the exterior surface 13b of tube 12b. Similarly, electrical isolation cut 32a prevents current flow between the interior surface 17a of tube 12a and the interior surface surface 17b of tube 12b.

For all described embodiments, it is envisioned that the electrolyte material can be selected from the following groups and mixtures thereof:
1) zirconia $(Zr_{1-x})A_xO_2$ (0.05<x<0.15) where (A=yttrium (Y), ytterbium (Yb), scandium (Sc), calcium (Ca), magnesium (Mg)) wherein A=Y and x=0.08 is preferred;
2) ceria $(Ce_{1-x})A_xO_2$ (0.05<x<0.30) where (A=samarium (Sm), gadolinium (Gd), Y, lanthanum (La), strontium (Sr)) wherein A=Gd and x=0.20 is preferred;
3) bismuth oxide $(Bi_2O_3)_{1-x}(A_2O_3)_x$ (0.05<x<0.30) where (A=Y, neodymium (Nd), Gd, erbium (Er), dysprosium (Dy), La) wherein A=Y and x=0.20 is preferred;
4) bismuth vanate $Bi_2V_{1-x}A_xO_{5.5-3x/2}$ (0.05<x<0.30) where (A=copper (Cu), titanium (Ti), zirconium (Zr), aluminum (Al), cobalt (Co), nickel (Ni)) wherein A=Cu and x=0.10 is preferred; and
5) lanthanum gallade $La_{1-x}Sr_xGa_{1-y}Mg_yO_3$ where (0<x<0.30)(where x=0.10 is preferred) and (0.00<y<0.30) (where y=0.20 is preferred).

For all described embodiments, it is envisioned that the electrode material can be selected from the following groups:
1) $La_{1-x}A_xMnO_3$ (0.00<x<1.00) where (A=Sr, Ca, Ba) where Sr=0.20 is referred; and
2) $La_{1-x}Sr_xCo_{1-y}Fe_yO_3$ For all described embodiments, the current collector can be selected from:
1) Noble Metals (silver (Ag), gold (Au), palladium (Pd), platinum (Pt)) where Ag is preferred; and
2) Alloys (Ag—Pd (20% Pd), Au—Pd) where Ag—Pd with 20% Pd is preferred.

To injection mold the ceramic element 100, the ceramic electrolyte is mixed with a binder. The injection molding binder system includes 30–70 vol % solids. The solid is the ceramic powder or electrolyte. The remaining volumetric percentage is a binder.

The binder materials can be selected from the following:
1) Agar (<10 vol %), Glycerin (<10 vol %), Water (>80 vol %);
2) Polymer, Wax, Oil, and Acid where
   a) the polymer is (0–75 vol %)=polystyrene (PS), polyethylene (PE), polypropylene (PP), ethylene vinyl acetate (EVA), polyvinyl alcohol (PVA), polyethylene glycol (PEG), polyethylene chlorate (PEC), polyvinyl chlorate (PVC), polyacetal;
   b) the wax is (0–75 vol %)=paraffin, microcrystalline, carnauba, beeswax;
   c) the oil is (0–75 vol %)=peanut oil, vegetable oil, mineral oil; and
   d) the acid is (0–20 vol %)=stearic, oleic, boric.
3) Methyl Cellulose (5–30 vol %), Water (>50 vol %), Glycerin (<20 vol %), Boric Acid (<10 vol %)

A complete module assembly 250 for an oxygen generator is depicted in FIG. 8. The module assembly 250 includes a ceramic element 100 bonded to ceramic element 100' using a commercially available ceramic loaded cement which forms a seal 260. Alternatively, a commercially available lithium-aluminum-silicate glass cement can be used. Advantageously, the stiffening ribs 180 are joined together providing a strong assembly capable of allowing the build up of internal pressures exceeding 2000 psi. The bonding of the ribs 180 both at the periphery of modules 100, 100' and in the center portions thereof also provides for additional stiffness. A positive electrical terminal 262 is connected to coating 210 on the upper surface 118 on one end of the module assembly 250 and a negative electrical terminal 264 is connected at an opposite end of the module assembly to coating 210. An oxygen outlet 266 is connected to a valve (not shown) which can be shut to allow oxygen pressure to build up within the module assembly 250. An oxygen generator of the size depicted in FIG. 8 which has a 1.8 inch width and a 3 inch length, with 0.13 inch diameter tubes having a length of 1.2 inches can generate about 300–350 cubic centimeters per minute of oxygen.

Refer now to FIG. 9A where a flow chart depicting the steps in the manufacturing process of a ceramic element 100 is depicted. At step 300, ceramic powder is received. The ceramic powder may be any of the compositions listed above. At step 302, the received ceramic powder is inspected. If the ceramic powder fails the inspection step 302, the ceramic powder is processed at step 304. The process may include calcinating the ceramic powder, milling the ceramic or adding chemical additives to the ceramic powder. At step 306, the feedstock binder system is prepared. The feedstock binder system may be any of the binder materials listed above. At step 308, the passed inspected powder and binder system are mixed. At step 310, the feedstock which includes the powder and binder system, are transferred to an injection molding machine. At step 312, the ceramic element 100 is injection molded. At step 314, the molded ceramic element 100 is inspected and if the molded part fails inspection then the molding conditions are adjusted at step 316. At step 318, the binder is removed leaving a dense ceramic electrolyte having a minimum density of ninety-two percent. At step 320, the ceramic element 100 is sintered. At step 322, the ceramic element 100 is inspected and should the element 100 fail inspection then the element is scrapped at step 324. At step 326. an electrode ink is prepared. At step 328, the electrode coating 200 is applied to an inspected ceramic element 100. At step 330, the coated ceramic element 100 is sintered. At step 332, the sintered coated ceramic element is inspected. Should the ceramic element fail inspection then at step 334 it is decided whether the sintered ceramic element should be reworked. If it is decided not to rework the ceramic element 100 then the ceramic element 100 is scrapped at step 336. At step 334, should it be decided that the ceramic element 100 should be reworked then the ceramic element is returned to step 328. Once the ceramic element passes inspection at step 332 then at step 336 a current collector ink is prepared. At step 338, the current collector coating 210 is applied over the sintered electrode coating. At step 340, the applied current collector coating 210 is sintered. At step 342 the sintered current collector coating 210 on the ceramic element 100 is inspected. Should the sintered ceramic element 100 fail inspection then at step 344 it is decided whether the ceramic element should be reworked. If it is decided that the ceramic element 100 should not be reworked then the ceramic element is scrapped at step 346. If at step 344, it is decided to rework the sintered current collector coating then the ceramic element 100 is returned to step 338.

As depicted in FIG. 9B, at step 348, via paste is prepared. At step 350, electrical via paste is applied in the vias 124. At step 352, the vias 124 are inspected. Should the vias 124 fail the inspection then at step 354 it is decided whether to rework the electrical paste in the vias. If it is decided not to rework the ceramic element 100 then the ceramic element is scrapped at step 356. Should it be decided to rework the electrical paste in the vias, then the modular ceramic element is returned to step 350. Once the electrical paste has been applied and the inspection step 352 passed, then at step 354, the bottom surface 118 is grinded. Also, the vertical side surfaces 144 are also ground at step 354. At step 356 the upper surface 116 has portions of the electrically conductive coatings isolated from adjacent portions (see 142A–142H) preferably using an electrical discharge machine. At step 358, the electrical isolation between adjacent columns of tubes is tested. Should the cut ceramic element fail the test then at step 360 it is decided whether to rework ceramic element 100. Should it be decided not to rework ceramic element 100 then ceramic element 100 is scrapped at step 362. Should it be decided at step 360 to rework the ceramic element 100 then the ceramic element 100 is returned to either step 354 or step 356. At step 354, sealing material is prepared. At step 366, the sealing material is applied to bottom surfaces 118 and 118'. At step 368, the two ceramic elements 118, 118' are joined together. At step 370, the sealing material is heat cured. At step 372, the seal is tested. Should the seal fail a pressure test or a leakage test then at step 374 it is decided whether to rework the joined ceramic elements 100. 100'. If it is decided not to rework the joined ceramic elements 100 and 100' then at step 376 both elements 100 and 100' are scrapped. If it is decided to rework the joined ceramic elements 100. 100' then at step 376 the ceramic elements 100, 100' are separated. At step 378, the bottom surfaces 118 and 118' are reground and after step 378 the ceramic elements are returned to step 376. Once the joined ceramic elements pass-the seal test then at step 374 the ceramic module assembly 250 is complete.

The present invention provides a unique oxygen concentrator capable of providing high pressure oxygen at or above 2000 pounds per square inch (PSI) without having any moving parts. Depending on the oxygen requirements, a plurality of modules 250 can be manifolded together and high pressure oxygen bottles can be filled without having to return the high pressure bottles long distances to a gas plant. Further, it should now be apparent that the present invention provides an electrochemical apparatus having simplified electrical connections, making the device less expensive to manufacture and more reliable.

It will be readily seen by one of ordinary skill in the art that the present invention fulfills all of the objects set forth above. After reading the foregoing specification, one of ordinary skill will be able to affect various changes, substitutions of equivalents and various other aspects of the invention as broadly disclosed herein. It is therefore intended that the protection granted hereon be limited only by the definition contained in the appended claims and equivalents thereof.

What is claimed is:

1. An oxygen generating ceramic element product produced by the method comprising the steps of:
   mixing a ceramic powder and a binder; and
   injection molding the mixed ceramic powder and binder into a ceramic element having a support portion and a plurality of projections extending therefrom.

2. The ceramic element product of claim 1, wherein the ceramic element product is formed of:
   an electrolyte comprising a material selected from the group consisting of:
   $Zr_{1-x}A_xO_2$, $Ce_{1-x}A_xO_2$, $(Bi_2O_3)_{1-x}(A_2O_3)_x$, $Bi_2V_{1-x}A_xO_{5.5-3x/2}$ and $La_{1-x}Sr_xGa_{1-y}Mg_yO_3$;
   wherein $0.00<x<0.30$; $0.00<y<0.30$ and A=Y, Yb, Sc, Ca, Mg, Sm, Gd, La, Sr, Nd, Er, Dy, Cu, Ti, Zr, Al, Co, Ni; and
   a binder for binding the electrolyte.

3. The ceramic electrolyte element of claim 2, wherein $0.05<x<0.30$.

4. The ceramic electrolyte element of claim 2, wherein $0.05<x<0.15$.

5. The ceramic electrolyte element of claim 4, wherein A=Y and x=0.08.

6. The ceramic electrolyte element of claim 2, wherein the electrolyte is $Zr_{1-x}A_xO_2$, $0.05<x<0.15$ and A is selected from the group consisting of Y, Yb, Sc, Ca and Mg.

7. The ceramic electrolyte element of claim 2, wherein the electrolyte is $Ce_{1-x}A_xO_2$ $0.05<x<0.30$ and A is selected from the group consisting of Sm, Gd, Y, La and Sr.

8. The ceramic electrolyte element of claim 7, wherein A=Gd and x=0.20.

9. The ceramic electrolyte element of claim 2, wherein the electrolyte is $(Bi_2O_3)_{1-x}(A_2O_3)_x$ $0.05<x<0.30$ and A is selected from the group consisting of Y, Nd, Gd, Er, Dy, La.

10. The ceramic electrolyte element of claim 9, wherein A=Y and x=0.20.

11. The ceramic electrolyte element of claim 2, wherein the electrolyte is $Bi_2V_{1-x}A_xO_{5.5-3x/2}$ and A is selected from the group consisting of Cu, Ti, Zr, Al, Co and Ni.

12. The ceramic electrolyte element of claim 2, wherein the binder comprises a polymer, a wax, an oil and an acid.

13. The ceramic electrolyte element of claim 12, wherein the polymer is selected from the group consisting of polystyrene, polyethylene, polypropylene, ethylene vinyl acetate, polyvinyl alcohol, polyethylene glycol, polyethylene chlorate, polyvinyl chlorate and polyacetal.

14. The ceramic electrolyte element of claim 13, wherein the wax is selected from the group consisting of paraffin, microcrystalline, carnuba and beeswax and wherein the oil is selected from the group consisting of peanut oil, vegetable oil and mineral oil and the acid is selected from the group consisting of stearic acid, oleic acid and boric acid.

15. The ceramic electrolyte element of claim 14, wherein the polymer is 0–75 vol. %, the wax is 0.75 vol. %, the oil is 0–75 vol. % and the acid is 0–20 vol. %.

16. The ceramic electrolyte element of claim 2, wherein the binder comprises agar, glycerin and water.

17. The ceramic electrolyte element of claim 16, wherein the agar is <10 vol. %, the glycerin is <10 vol. %, and the water is <80 vol. %.

18. The ceramic electrolyte element of claim 17, wherein the binder comprises methyl cellulose, water, glycerin and boric acid.

19. The ceramic electrolyte element of claim 18, wherein the methyl cellulose is 5–30 vol. %, the water is >50 vol. %, the glycerin is <20 vol. % and the boric acid is <10 vol. %.

20. The ceramic electrolyte element of claim 19, wherein the electrolyte is $La_{1-x}Sr_xGa_{1-y}Mg_yO_3$ and $0.00<x<0.30$ and $0.00<y<0.30$.

21. The ceramic electrolyte element of claim 20, wherein x=0.10 and Y=0.20.

* * * * *